No. 661,531. Patented Nov. 13, 1900.
A. G. HOHENSTEIN.
STEAM BOILER.
(Application filed Feb. 16, 1900.)

(No Model.) 6 Sheets—Sheet 3.

No. 661,531. Patented Nov. 13, 1900.
A. G. HOHENSTEIN.
STEAM BOILER.
(Application filed Feb. 16, 1900.)
(No Model.) 6 Sheets—Sheet 5.

WITNESSES:
Herbert Bradley.
D. E. Gaither.

INVENTOR
Archie G. Hohenstein
by Damuri S. Wolcott Att'y.

No. 661,531. Patented Nov. 13, 1900.
A. G. HOHENSTEIN.
STEAM BOILER.
(Application filed Feb. 16, 1900.)
(No Model.) 6 Sheets—Sheet 6.
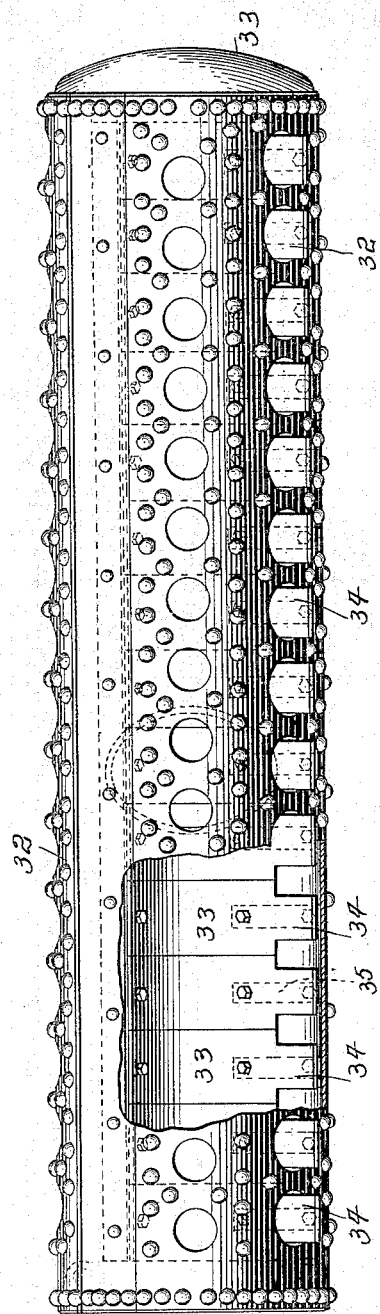
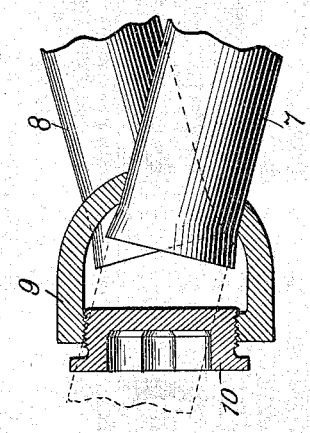
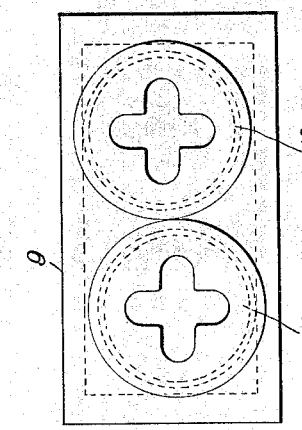
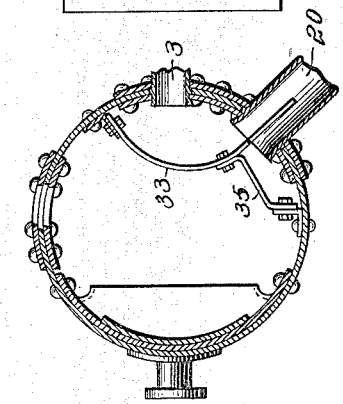
WITNESSES:
INVENTOR

United States Patent Office.

ARCHIE G. HOHENSTEIN, OF NEW HAVEN, CONNECTICUT.

STEAM-BOILER.

SPECIFICATION forming part of Letters Patent No. 661,531, dated November 13, 1900.

Application filed February 16, 1900. Serial No. 5,439. (No model.)

*To all whom it may concern:*

Be it known that I, ARCHIE G. HOHENSTEIN, a citizen of the United States, residing at New Haven, in the county of New Haven and State of Connecticut, have invented or discovered certain new and useful Improvements in Steam-Boilers, of which improvements the following is a specification.

In an application filed February 16, 1900, and serially numbered 5,438 (1900) I have described and shown certain improvements in water-tube boilers of the class or kind forming the subjects-matter of applications filed December 12, 1898, and February 16, 1900, whereby such boilers are especially adapted for marine purposes.

The invention described in this application consists in certain further improvements in the marine class of boilers having for their object a simplification in the structure and more ready accessibility for repairs and renewals.

The invention is hereinafter more fully described and claimed.

Figure 1:
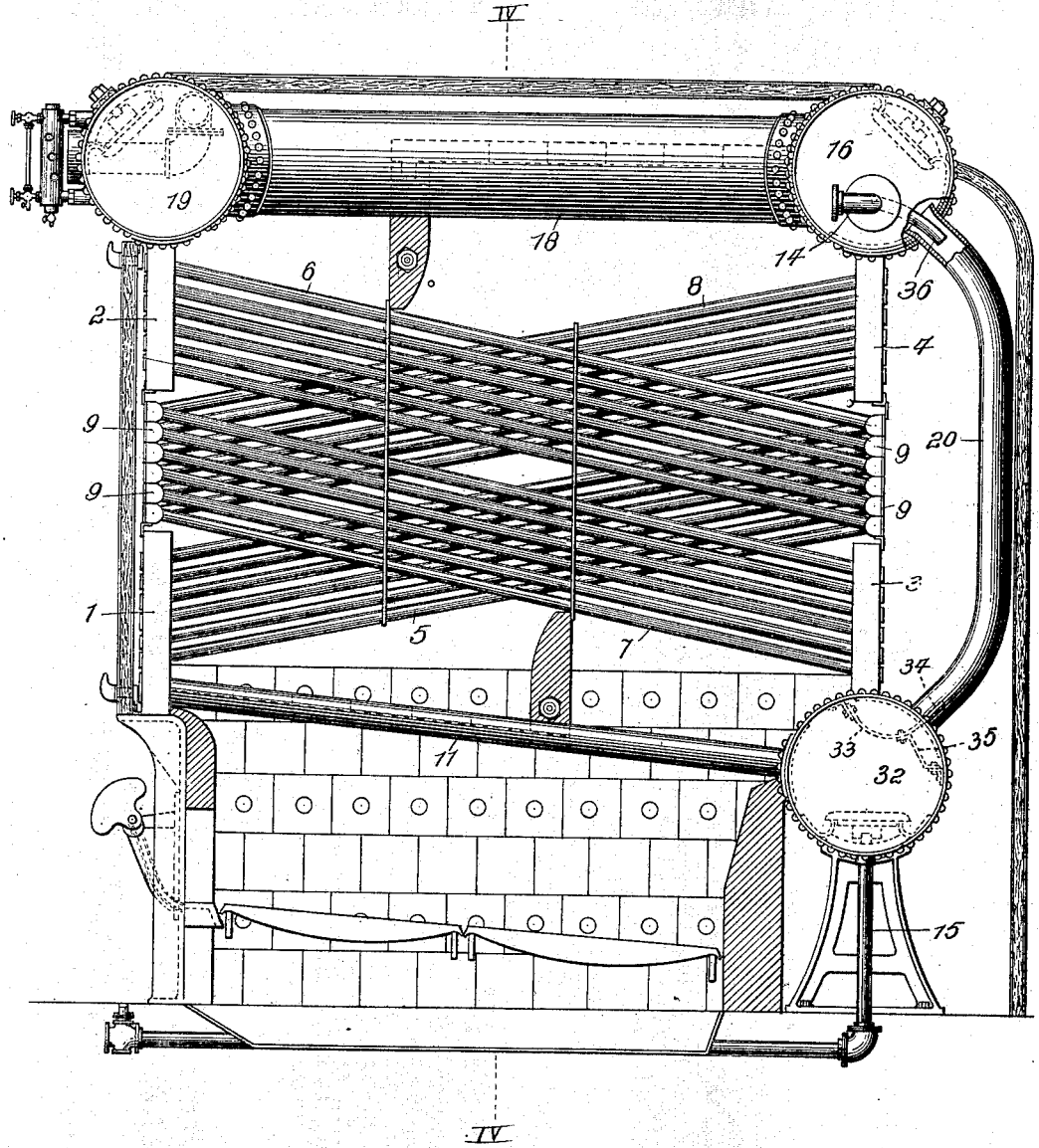
Figure 2:
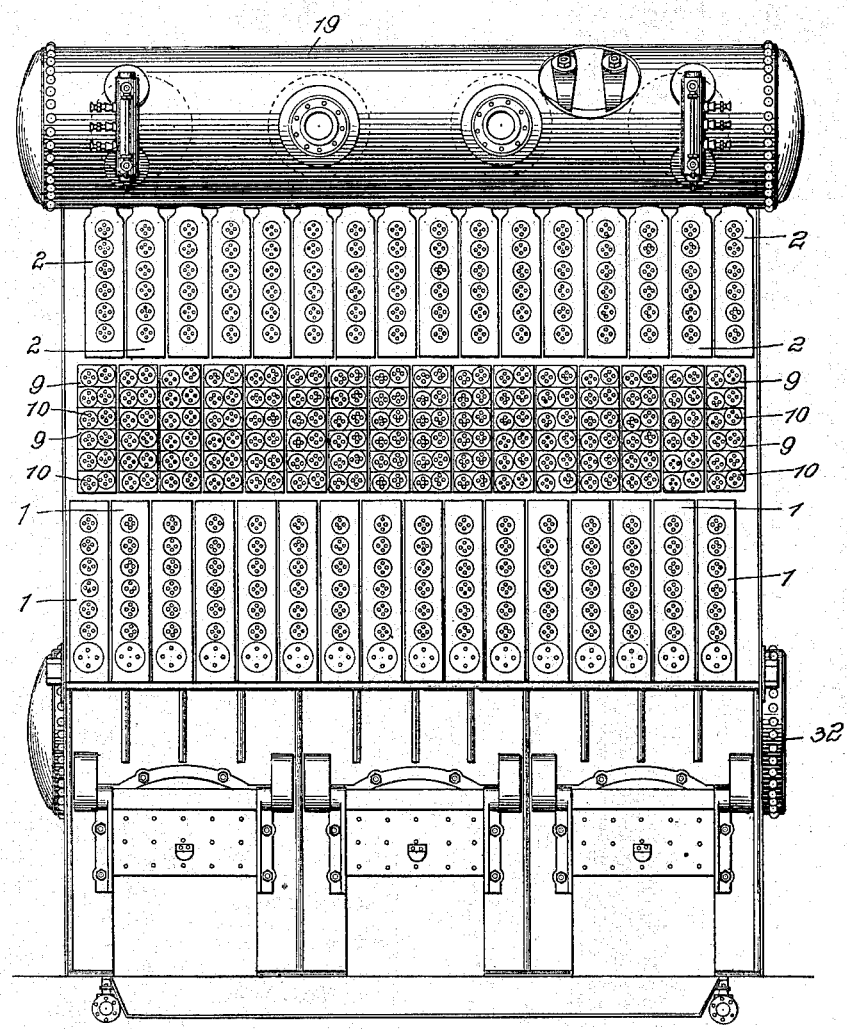
Figure 3:
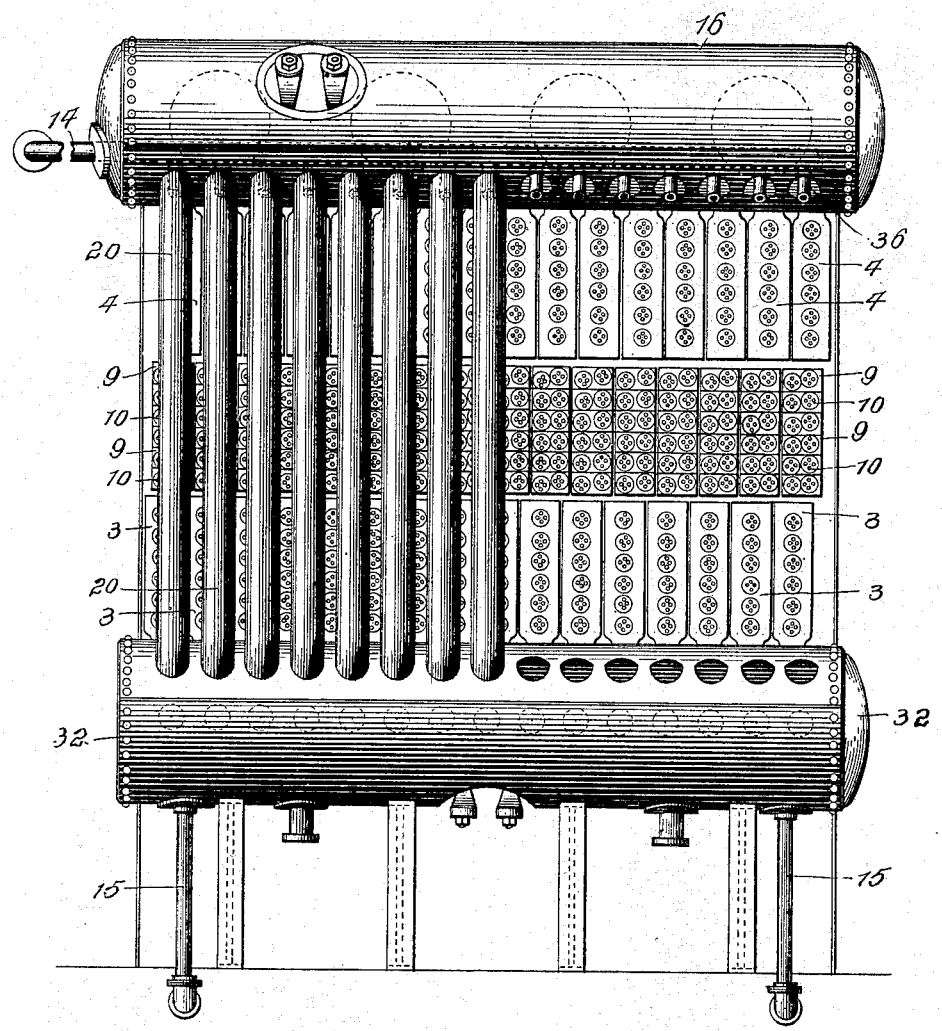
Figure 4:
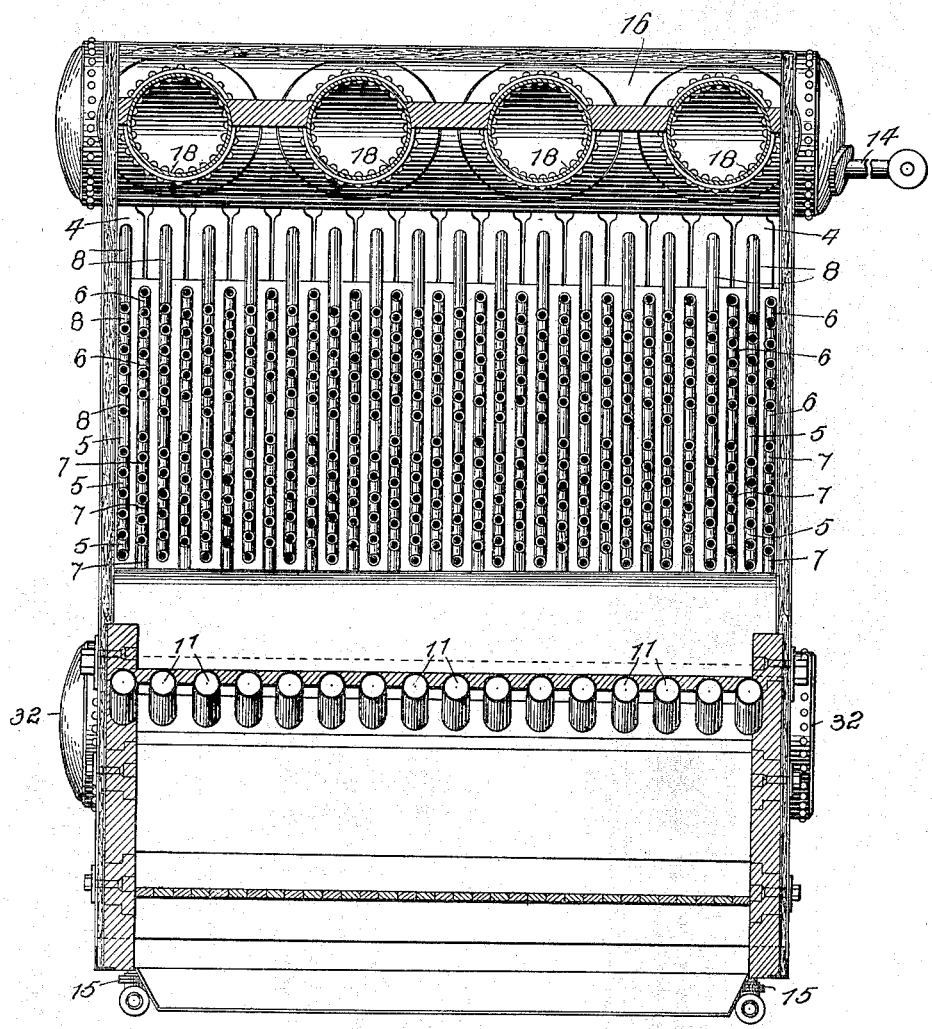
Figure 5:
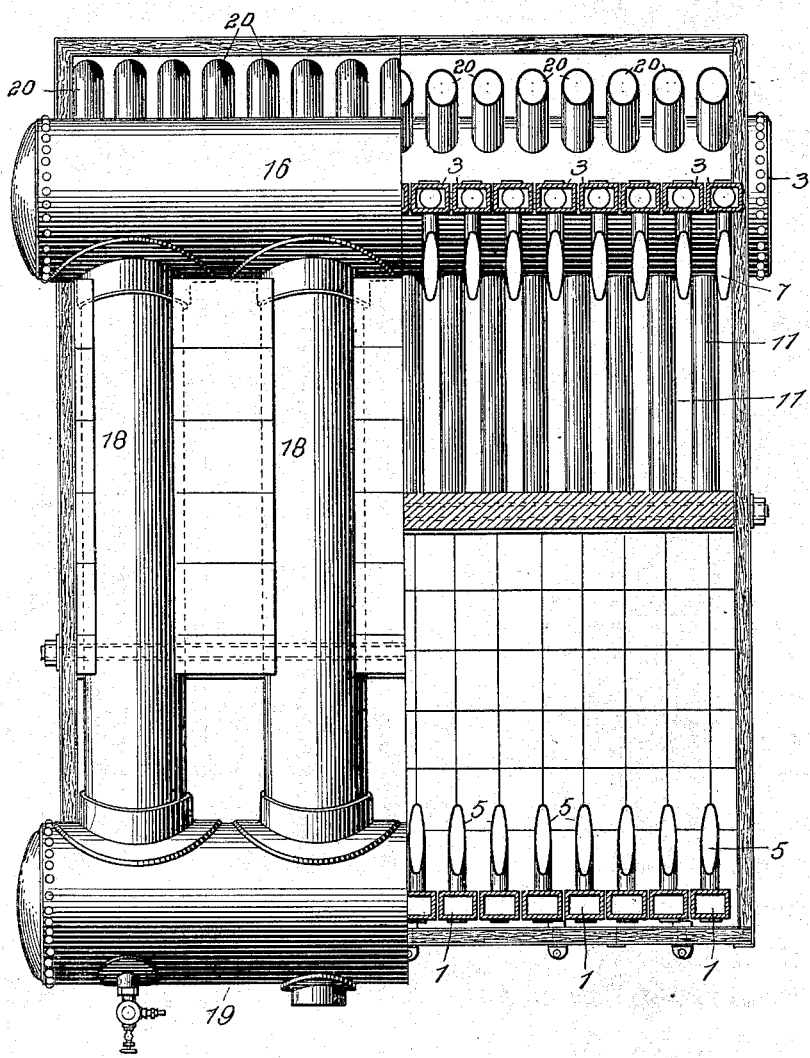

In the accompanying drawings, forming a part of this specification, Figure 1 is a side elevation of my improved boiler. Fig. 2 is a front elevation, and Fig. 3 is a rear elevation, of the boiler, a portion of the downtake-pipes being removed. Fig. 4 is a sectional elevation of the boiler, the plane of section being indicated by the line IV IV, Fig. 1. Fig. 5 is a view in top plan and sectional plan of the boiler. Fig. 6 is a plan view of the lower drum, a portion of its wall being broken away to show the baffle-plates. Fig. 7 is a transverse section of the drum, and Figs. 8 and 9 are front and sectional elevations of the return bends or boxes.

In the practice of my invention the headers 1 2 3 4 are arranged and connected by the banks of tubes 5 6 and 7 8, as described in the two applications referred to. The front and rear upper headers 2 and 4 are connected, respectively, to the front and rear drums 19 and 16, which are made cylindrical and of sufficient size to permit of the entrance of a workman through suitable manholes in each drum. These drums are connected by tubes 18, having a carrying capacity about fifty per cent. in excess of the carrying capacities of the headers 2. The lower rear headers 3 are connected to a drum 32, so arranged in the rear of the fire-box that a portion thereof will be directly subjected to the hot burning gases, as clearly shown in Fig. 1. This drum is also connected to the lower ends of the lower front headers 1 by heavy tubes 11, adapted to receive the direct impact of the hot gases from the fire-box, and being below the banks of the comparatively light cross-tubes will protect them from injury by the intense heat.

The upper and lower rear drums 16 and 32 are connected by curved downtake-pipes 20. By reason of the curvature of these downtake-pipes the drum 16 can be shifted forward directly over the rear headers and can be made cylindrical without any reduction of the space necessary in the rear of the boiler for repairs. The downtake-pipes 20 are made of a conveying capacity at least equal to the combined carrying capacities of the tubes 11 and the banks of the tubes 7, extending from the lower rear headers 3, which, as stated, are connected to the drum 32, said drum being in or approximately in line with the drum 16 and headers 3 and 4. The drum 32 may be properly considered the initial point of the circulation from which spring the two currents as two systems of currents characteristic of my improved boilers. While it is believed that these two currents, one of which flows through the tubes 11 and the other through the headers 3, will start practically simultaneously and will persist in their initial directions, it is preferred to insure the formation and continuance of such currents. To this end baffle-plate 33 is so arranged in the drum 32 as to divide the currents flowing through downtake-pipes and direct the divided portions toward the tubes 11 and the headers 3, respectively, as shown in Figs. 1, 6, and 7. This baffle-plate is preferably formed in sections which have one edge secured to the wall of the drum in front of the junction of the headers 3 with the drum and the opposite edges extending diametrically across the lower ends of the downtake-pipes 20. It is preferred to form tongues 34 on the baffle-plate sections, said tongues projecting a short distance into the downtake-pipes. The edges of the baffle-plate sections adjacent to the pipes 20 are preferably held in position by a series of brackets 35, having one end attached to the sections and the opposite ends secured to the drum, as shown in Fig. 7. Although water may be introduced into the boiler at any desired point or points, it is preferred to connect the supply-pipe 14 to the upper rear drum 16. As the mingling of comparatively cool water with that contained in the drum which forms one of the steam-breaking spaces would possibly have a material chilling action, it is preferred to extend the feed-pipe 14 along in front of the upper ends of the downtake-pipes 20, said pipe having discharge-openings in line with the downtakes. It is preferred that the discharge-openings should be formed by nozzles 36, projecting into the downtakes, as shown in Figs. 1 and 3. By thus feeding the water direct into the downtakes any material chilling of the water in the drum is prevented and the chilling action of the feed-water is applied to the down currents through the pipes 20, thereby accelerating downward circulation through the downtakes and heating the feed-water to nearly boiler temperature before reaching the lower drum. The heating of the feed-water in the downtakes is desirable, as it effects a precipitation of solid matter in the water as the water moves toward the drum 32, in which the precipitate will settle and be removed through the blow-off pipes 15, connected to the drum.

It is further characteristic of the construction of the boiler that the headers 2, 3, and 4 are made similar in construction, thereby simplifying the construction and erection of the boiler, as the same header can be placed in either position.

I claim herein as my invention—

1. In a water-tube boiler, the combination of three drums, two of said drums being arranged in or approximately in the same horizontal plane above the other drum, two series of tubes extending from the lower drum and connected respectively to the upper drums, tubes connecting the upper drums and downtake-pipes connecting one of the upper drums to the lower drum, substantially as set forth.

2. In a water-tube boiler, the combination of three drums, two of said drums being arranged in or approximately in the same horizontal plane above the other drum, two series of tubes extending from the lower and connected respectively to the upper drums, tubes connecting the upper drums, and curved downtake-pipes connecting one of the upper drums with the lower drum whereby a space is formed between the series of tubes and the downtakes, substantially as set forth.

3. A boiler having in combination a series of upper front headers, a series of lower front headers, a series of upper rear headers, a series of lower rear headers, cross-tubes connecting said headers, two connected drums connected respectively to the upper headers, a drum connected to the lower headers, and curved downtake-pipes connecting the rear headers, substantially as set forth.

4. A boiler having in combination a series of upper front headers, a series of lower front headers, a series of upper rear headers, a series of lower rear headers, cross-tubes connecting said headers, two connected drums connected respectively to the upper headers, a drum connected to the lower headers, downtake-pipes connecting the rear drums, a feed-pipe extending into the upper rear drum, and having discharge-openings in line with the downtake-pipes, substantially as set forth.

5. A boiler having in combination a series of upper front headers, a series of lower front headers, a series of upper rear headers, a series of lower rear headers, cross-tubes connecting said headers, two connected drums connected respectively to the upper headers, a drum connected to the lower rear headers, a series of tubes connecting said drum with the lower front headers, downtakes connecting the rear drums, and a baffle-plate arranged in the lower drum and extending from the downtakes across the drum to a point between the junctions of the tubes and headers with the drum, substantially as set forth.

In testimony whereof I have hereunto set my hand.

ARCHIE G. HOHENSTEIN.

Witnesses:
DARWIN S. WOLCOTT,
F. E. GAITHER.